(12) United States Patent
Funck et al.

(10) Patent No.: US 9,086,309 B2
(45) Date of Patent: Jul. 21, 2015

(54) METHOD AND DEVICE FOR CALIBRATING MEASURING TRANSDUCERS OF ULTRASONIC FLOW METERS

(75) Inventors: Bernhard Funck, Rostock (DE); Andreas Mitzkus, Berlin (DE)

(73) Assignee: FLEXIM Flexible Industriemesstechnik GmbH, Berlin (DE)

( * ) Notice: Subject to any disclaimer, the term of this patent is extended or adjusted under 35 U.S.C. 154(b) by 297 days.

(21) Appl. No.: 13/130,533

(22) PCT Filed: Nov. 19, 2009

(86) PCT No.: PCT/EP2009/065481
§ 371 (c)(1), (2), (4) Date: May 20, 2011

(87) PCT Pub. No.: WO2010/057951
PCT Pub. Date: May 27, 2010

(65) Prior Publication Data
US 2011/0231137 A1    Sep. 22, 2011

(30) Foreign Application Priority Data

Nov. 21, 2008  (DE) .................. 10 2008 058 527
Nov. 19, 2009  (DE) .................. 10 2009 046 871

(51) Int. Cl.
| G10F 1/12 | (2006.01) |
| G01F 1/50 | (2006.01) |
| G01F 25/00 | (2006.01) |
| G01L 27/00 | (2006.01) |
| G01F 1/66 | (2006.01) |

(52) U.S. Cl.
CPC ............ *G01F 25/0007* (2013.01); *G01F 1/667* (2013.01)

(58) Field of Classification Search
USPC ............................................. 702/100
See application file for complete search history.

(56) References Cited

U.S. PATENT DOCUMENTS

| 4,762,012 A | 8/1988 | Brown | |
| 5,531,124 A * | 7/1996 | Kim et al. | 73/861.27 |
| 6,460,419 B2 * | 10/2002 | Su | 73/861.31 |
| 7,343,821 B2 * | 3/2008 | Panicke et al. | 73/861.25 |
| 7,506,532 B2 * | 3/2009 | Funck et al. | 73/1.16 |
| 2001/0037688 A1 * | 11/2001 | Chang | 73/861.29 |
| 2002/0053243 A1 * | 5/2002 | Su | 73/861.28 |

(Continued)

FOREIGN PATENT DOCUMENTS

| DE | 30 29 140 | 2/1982 |
| DE | 10 2004 031 274 | 12/2006 |

(Continued)

*Primary Examiner* — John Breene
*Assistant Examiner* — Manuel Rivera Vargas
(74) *Attorney, Agent, or Firm* — Jordan and Hamburg LLP (57) ABSTRACT

The invention relates to a method for calibrating the transmitters of ultrasonic flow meters according to the transit time difference method. The object of the invention is to provide a method for calibrating the transmitters of ultrasonic flow meters, said calibration being able to be carried out independently of the other components of the meter, such as the acoustic transducers and the pipe in which the fluid flow being measured occurs. According to the invention, the measurement signals are generated by means of an artificial simulation of the measurement path. This allows the transmitter to be calibrated independently of the remaining components of the measuring apparatus, such as the measuring tube and the acoustic transducers.

19 Claims, 2 Drawing Sheets

(56) References Cited

U.S. PATENT DOCUMENTS

2007/0084298 A1\* 4/2007 Rieder et al. ............. 73/861.356
2009/0000392 A1 1/2009 Zhou et al.
2011/0231137 A1\* 9/2011 Funck et al. .................. 702/100

FOREIGN PATENT DOCUMENTS

DE 10 2005 037 458 2/2007
WO WO 2009091615 A2 \* 7/2009

\* cited by examiner

METHOD AND DEVICE FOR CALIBRATING MEASURING TRANSDUCERS OF ULTRASONIC FLOW METERS

BACKGROUND OF THE INVENTION

The invention relates to a method for calibrating transmitters of ultrasonic flow meters according to the transit time difference method.

Ultrasonic flow meters are widely used in numerous industrial sectors. Ultrasonic flow meters according to the transit time difference method measure the difference of the transit time of two acoustic signals that propagate in and against the flow direction and use the transit time difference to calculate the volumetric flow rate. The transit time difference $\Delta t$ depends on the average flow velocity VI along the sound path, the angle of incidence $\alpha$ in the fluid and the transit time tl of the acoustic signal in the fluid. The following equation shows the calculation of the flow velocity:

$$VI=KT^*(\Delta t/2tl) \quad (1)$$

KT is the transducer constant that determines the angle of incidence in the fluid. In case of acoustic transducers that are mounted on the outside of the tube, called clamp-on acoustic transducers, the following equation applies:

$$KT=c\alpha/\sin(\alpha) \quad (2)$$

The angle of incidence in the fluid is defined by the law of refraction and is derived from the angle of incidence $\alpha$ and the sound speed $c\alpha$ in the acoustic transducer. In order to calculate the volumetric flow rate, it is necessary to determine the fluidmechanical calibration factor KF, which shows the relationship between the average flow velocity across the cross-section area VA and the average flow velocity along the sound path VI:

$$KF=VA/VI \quad (3)$$

Therefore, the volumetric flow rate Q is calculated as follows from the cross-section area A of the tube:

$$Q=KF^*A^*KT^*(\Delta t/2tl) \quad (4)$$

Usually, ultrasonic flow meters are calibrated with the help of a flow calibration rig. The flow meter is inserted in the pipe. In the case of clamp-on acoustic transducers, the acoustic transducers are instead mounted on the pipe. The displayed volumetric flow rate is compared with the reference volumetric flow rate and a calibration factor is calculated, if necessary. In the case of clamp-on transducers, while the measuring pipe in which the fluid flow being measured occurs is part of the measuring apparatus, usually it can not be calibrated together with the transmitter. Therefore, the calibration result can not be completely applied to the future measurement point. In order to avoid this disadvantage, it would be necessary to remove the pipe from the measurement point and install it in the calibration rig. Doing this would abandon the most important advantage of the clamp-on measurement, namely the non-intrusiveness. In some cases, it is only possible to calibrate the flow meter on site if a corresponding reference measurement is available at the facility. Mostly, this is not the case. Usually, a clamp-on measurement is calibrated by mounting the acoustic transducers onto the pipe of a calibration rig. Preferably, the pipe of the calibration rig has the same nominal diameter as the pipe on which the flow meter is to be installed later. The fluidmechanical conditions of the calibration rig, namely the flow profile and the pipe geometry, act as additional sources of error. Therefore, it is necessary to make sure that the flow profile is ideal. This can require a lot of effort, especially with large nominal diameters. Besides, it is necessary to determine the tube geometry with a very high accuracy. Therefore, it is preferable to create a calibration method that only contains parts of the measuring apparatus that will remain unchanged when used at the future measurement point.

In DE 102004031274 B4 a method is described that provides for the calibration of clamp-on acoustic transducers where the acoustic calibration factor KT of ultrasonic flow meters is calibrated without the need for a reference volumetric flow rate. A difference in position of the acoustic transducers is achieved by moving them with respect to each other and the associated transit time difference is measured. The emitting surfaces of the two acoustic transducers are arranged in parallel planes on acoustically opposite sides of the tube. It is not possible to calibrate the transmitters with this arrangement.

DE3029140A1 describes a device for the calibration of acoustic flow velocity meters by simulating transit times by means of delay elements. In order to be able to use this device for calibrating a transmitter, a modification of the circuits of the transmitter is required. Furthermore, the patent describes a delay line that contains electro-acoustic transducers. With this method, it is possible to calibrate the entire meter, including the acoustic transducers. However, it is not possible to calibrate the transmitter independently of the acoustic transducers.

U.S. Pat. No. 4,762,012A describes an arrangement that provides for the testing of the transmitter without using the acoustic component of the measuring apparatus. The acoustic transducers and the other elements of the measuring apparatus, such as the pipe and the flowing fluid, are simulated electronically. For this, two delay generators are proposed. The first delay generator, started by the emitted signals of the transmitter, simulates the transit time of the stationary fluid. The second delay generator, triggered by the first one, generates an additional delay which, when operation in and against the flow direction is simulated, is different and therefore simulates the influence of the flow direction on the transit time of the acoustic signals. The second delay generator starts a signal shaping network, which generates the artificial signals fed into the transmitter. The invention provides for the simulation of discrete transit times with a quantization that depends on the clock rate of the delay generators. The simulated signal shape can not be selected freely but is defined by the signal shaping network.

US2009000392A1-1 also contains a description of a measuring apparatus where the transit times of the signals in and against the flow direction are generated by means of a delay generator. A rough delay is combined with a fine delay. The signals are generated by a digital-to-analog converter, which converts a digital representation of the signals to be simulated to analog signals. The digital-to-analog converter is started by the delay generator.

SUMMARY OF THE INVENTION

The known solutions require a delay generator. The resolution of the signal transit times that can be simulated is always limited by the basic clock rate of the oscillator. Another limitation of the known solutions is the fact that the same signal shape is emitted in both directions. However, the shapes of the signals of an ultrasonic flow meter in and against the flow direction are not completely identical. Especially with high flow velocities, the signal shapes in and against the flow direction are considerably different.

The object of the invention is the creation of a method for calibrating the transmitter of ultrasonic flow meters independently of the other components of the flow meter, such as the acoustic transducers and the pipe in which the fluid flow being measured occurs. The aim is to be able to define continuously variable transit times of signals in and against the flow direction and transit time differences of signals in and against the flow direction. It must be possible to generate different signal shapes in and against the flow direction.

According to the present invention, this object is achieved by creating an artificial simulation of the measurement path, which responds to the emitted signals generated by the transmitter at the two acoustic transducer terminals with received signals, which are delayed with respect to the emitted signals by a predetermined transit time and whose transit times differ by a predetermined transit time difference. In order to achieve this, the artificial measurement path contains two digital-to-analog converters, each of which is assigned to a terminal of the transmitter and one of which generates the signal in the flow direction, and the other generates the signal against the flow direction. This is achieved by storing the digital representations of these two signals in a memory and having the emitted signal of the transmitter start the output of the signals to the two outputs of the digital-to-analog converter. As a result of this method, the transit times of the two signals can be varied continuously without the need for a particularly high clock rate. The clock rate of the clock generator only has to be high enough to conform to the sampling theorem. The transit time difference of the two signals can be simulated with a resolution that is smaller than $1/1000$ of the clock period of the clock generator. Any signal shape of the two signals can be specified, meaning that it is possible to simulate the signal shape differences that can be observed at higher flow velocities. The method makes it possible to use commercially available signal generators. This supports and simplifies traceability of the calibration with respect to national and international standards.

The comparison of the measured transit time and transit time difference of the signals with the predetermined transit times and transit time difference results in the measurement error of the transmitter in the transit time measurement or transit time difference measurement. In order to achieve this, an emitted signal at one of the acoustic transducer terminals generates a first received signal, which is delayed with respect to the emitted signal by a predetermined first transit time, and another emitted signal at the other acoustic transducer terminal generates a second received signal which is delayed with respect to the emitted signal by a second predetermined transit time.

For the method according to the present invention, an emitted signal at the terminal T1 of the transmitter is responded to by a received signal at least to the terminal T2 of the transmitter, and an emitted signal at the terminal T2 of the transmitter is responded to by a received signal at least to the terminal T1 of the transmitter by means of the simulation of the measurement path. The two response signals to the emitted signals at the terminals T1 or T2 of the transmitter are each generated independently of each other by a digital-to-analog converter, and the respective digital representations of the response signals are calculated independently of each other and stored in the memory of the respective digital-to-analog converter in such way that after the transit time t1 or t2 with respect to the respective emitted signal, which is predetermined independently, an amplitude that is different from zero is output at the terminal T1 or T2. The measurement error of the transmitter is usually calculated by comparing the predetermined values with the respective measured values. In accordance with the measuring method described in the equations (1)-(4) and (8)-(11), the transmitter calculates the transit time t1 between the emitted signal at the terminal T1 and the respective response signal, and the transit time t2 between the emitted signal at the terminal T2 and the respective response signal as well as the difference t2-t1 of the transit time of the two response signals. Several comparisons are made in order to determine the measurement error by comparing the three results of the measurement conducted by the transmitter with the respective predetermined values (t1, t1, t2-t1). The predetermined value for t2-t1 is calculated from the numerical difference between the predetermined values t1 and t2. The measurement error of the transmitter is calculated from the comparison of the values for the predetermined and measured values of the transit time t1 between the emitted signal at the terminal T1 and the respective response signal and for the transit time t2 between the emitted signal at the terminal T2 and the respective response signal as well as between the difference t2-t1 of the predetermined transit times of the two response signals and the measured transit time difference t2-t1 of the two response signals.

The predetermined values of the transit times between the emitted signals at the terminals T1 and T2 and the respective response signals are calculated from a predetermined value of the volumetric flow rate. The measurement error of the transmitter is calculated from the comparison of the predetermined value of the volumetric flow rate and the volumetric flow rate calculated by the transmitter from the response signals.

As a design variation, the two predetermined transit times between the emitted signal at the terminal T1 or T2 and the corresponding response signal are calculated from the same parameters of the measurement point as those used for the parametrization of the transmitter.

The comparison is made either between the average transit time measured by the transmitter from the two response signals and the transit time difference measured between the emitted signal at the terminals T1 or T2, and between the respective response signal and the measured transit time difference of the two response signals and the average value or the difference of the predetermined transit time, or between the volumetric flow rate calculated by the transmitter from the two response signals and the volumetric flow rate that results from the two predetermined transit times according to the flow meter formula of the transmitter.

The method offers the possibility to calibrate the transmitter without the influences of the other components of the measuring apparatus. A correction factor is calculated from the calibration result and stored in the transmitter. Furthermore, it eliminates the need for a flow calibration rig. Instead of a flow rate reference, a time reference is used. Time references can be implemented much more precisely than flow rate references. Besides, the costs are considerably lower than the costs incurred when using a flow calibration rig.

The transmitter uses a data interface to retrieve the predetermined value of the volumetric flow rate from the artificial simulation of the measurement path, using these values to calculate the measurement error and the correction factor for an adjustment in the transmitter.

The parametrization of the artificial simulation of the measurement path is made by the transmitter itself by connecting the transmitter to the artificial simulation of the measurement path by means of a suitable data interface, calculating the signals on the basis of the measurement point parameters and the predetermined value of the volumetric flow rate and transferring them to the artificial simulation of the measurement path.

The parameter sets for one or several measurement points that can be described by an artificial simulation of the measurement path are stored in the transmitter.

The device consists of a signal shaping unit and a signal source. The transmitter is connected to the signal shaping unit via its acoustic transducer terminals and the signal source is connected to the signal shaping unit via the trigger input and the two signal outputs. The signal shaping unit generates a trigger impulse from the incoming emitted signals which is transferred to the signal source. When the trigger impulse arrives, the signal source generates the two required response signals. The response signals are forwarded by the signal shaping unit to the acoustic transducer terminals of the transmitter. An independent signal source is assigned to each acoustic transducer terminal of the transmitter. For this, the signal source contains two independent digital-to-analog converters, each having its own memory for the storing of the digital representation of the response signal that is to be generated. The signal that is to be generated is calculated as a digital sequence of numbers of the instantaneous values of the response signal curve and stored in the memory of the digital-to-analog converter. These instantaneous values typically correspond to the instantaneous values of the voltage curve of the response signal. The number of points to be stored is determined by the clock rate of the digital-to-analog converter. The clock rate must be high enough to conform to the sampling theorem. Therefore, the corresponding periodic time of the clock can be considerably larger than the target resolution of the transit times t1 and t2. The calculated digital images of the two response signals are stored directly in the memory and their output is started immediately when the trigger impulse is received. Conceivable, but not necessary, is a delay by an integral multiple of the clock period. By doing this, it is possible to generate any signal shape for the two response signals assigned to the terminals T1 and T2. Given that the signal shape can be generated arbitrarily, the calculation can be made in such way that the transit time with respect to the emitted signal and the trigger impulse generated from it can also be adjusted arbitrarily. As a result, the resolution of the transit time is significantly smaller than the clock period of the digital-to-analog converter. Typically, the achievable resolution of the transit time is $1/1000$ of the clock period. Therefore, the delay lines as known and required for prior art are completely unnecessary. With this method, the calibration device is greatly simplified and its measurement uncertainty is easily authenticated with respect to national standards because only the uncertainty the clock generator determines the uncertainty of the calibration device.

Among others, the signal source can be a two-channel arbitrary signal generator. With an arbitrary signal generator, the signal is usually generated by using a digital-to-analog converter to convert the signal shapes stored in the memory of the generator to analog signals and amplifying them. Thus, the signal shapes are stored in the generator as sequences of numbers. The parametrization of the generator with the signal shapes can be carried out, for example, by means of a computer connected to the generator. However, it is also conceivable to implement the function of the computer in the signal generator in such way that the generator itself can carry out the calculation of the signal shapes. Alternatively, the generator can also be fed with real recorded signals.

In the following, embodiments of the invention are explained in detail with the help of the drawings.

DETAILED DESCRIPTION OF THE INVENTION

An ultrasonic flow meter basically consists of a transmitter, the acoustic transducers and the pipe in which the fluid flow being measured occurs. The acoustic transducers are either installed in the tube or, in the case of the clamp-on flow meter, mounted on the outside of the tube. In the following, the unit consisting of the acoustic transducers and the pipe in which the fluid flow being measured occurs will be referred to as the measurement path.

The transmitter of an ultrasonic flow meter generates the signals for the acoustic transducers and amplifies the received signals for the subsequent signal processing, which also takes place in the transmitter and basically consists in determining the transit time and the transit time difference. Based on the measurement path model, which can, for example, be described with the equations (1)-(4), the transmitter determines the volumetric flow rate.

The factors KF, A and KT in the equation (4) are determined by the acoustic transducers and the measuring tube, thus, by the acoustic and fluidmechanical properties of the measurement path. While they are used by the transmitter for calculating the results of the measurement, they are not influenced by it. Conversely, it is assumed that the measurement path has no influence on the properties of the time measurement taking place in the transmitter. Thus, the transmitter and the other components of the flow meter are assumed to be non-reactive to each other. Furthermore, it is assumed that the time measurement is independent of the shape and amplitude of the received signals. In practical operation of the ultrasonic flow meter, the amplitude of the received signals can be very different. The amplitude depends on the attenuation characteristics of the measurement medium, the size of the tube and the used signal frequency. The signal shape also varies. Therefore, the fact that the time measurement works independently of these signal properties is a significant prerequisite for the practical operation of the ultrasonic flow meter. This is also the basic idea of the invention, namely the calibration of the transmitter with artificial signals which, in their properties, represent the typical ultrasonic signals.

The transmitter part of the total measurement error of the flow meter is the error in the transit time measurement and the transit time difference measurement. Therefore, the task of calibrating the transmitter consists in determining the measurement error of the transit time and the transit time difference.

However, the transmitter also calculates the volumetric flow rate from the measured transit times. Therefore, it is useful to include this calculation in the calibration by comparing the volumetric flow rate displayed by the transmitter with a predetermined volumetric flow rate and, by doing this, determining the measurement error of the volumetric flow rate.

Figure 1:
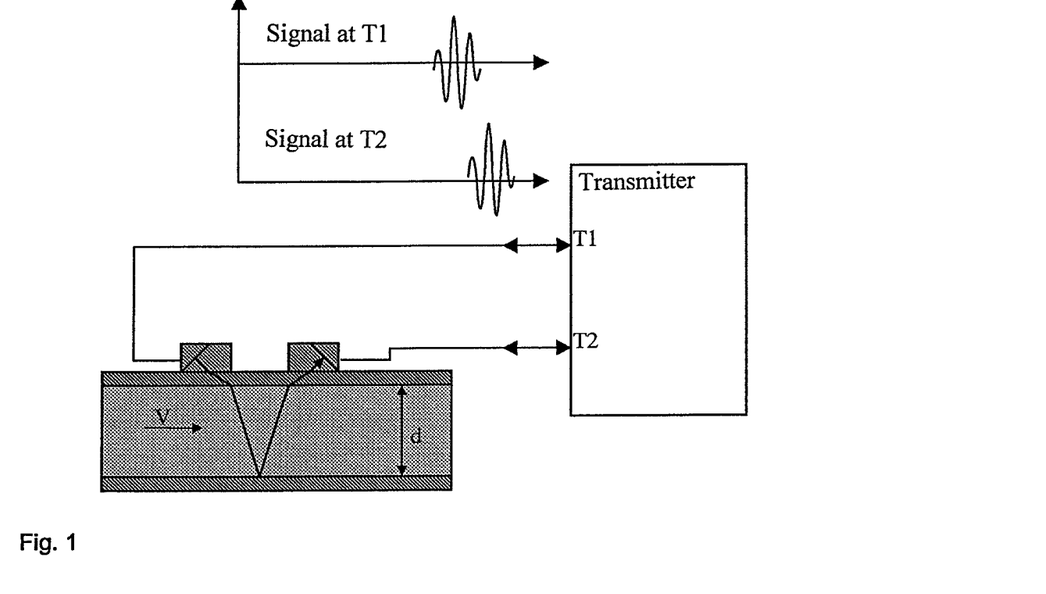
FIG. 1 shows a transmitter with the connected acoustic transducers mounted on the measuring tube and the received signals at the terminals T1 and T2 of the transmitter.

FIG. 1 shows the essential components of an ultrasonic flow measurement and the received signals at the terminals of the transmitter. A clamp-on measuring apparatus is displayed, meaning that the acoustic transducers are mounted on the outside of the tube.

Figure 2:
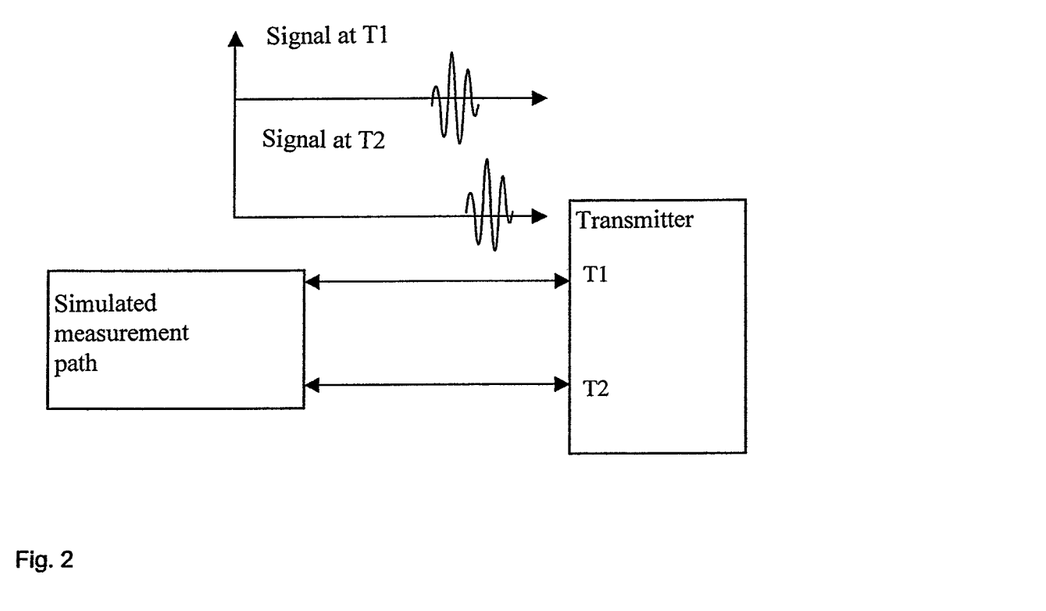
FIG. 2 shows the transmitter with the artificial measurement path, which is connected instead of the acoustic transducers, and the received signals at the terminals T1 and T2 of the transmitter.

FIG. 2 shows the transmitter connected to an artificial measurement path. This artificial measurement path responds to the emitted signals of the transmitter with received signals, which are delayed with respect to the emitted signals by the transit times that have the exact same value as the transit times of the equivalent real measurement path. A two-channel generator for arbitrary signals can be used to generate the signals. Generators capable of generating time-limited signals with a transit time accuracy sufficient for this task have been offered by different companies for several years.

Figure 3:
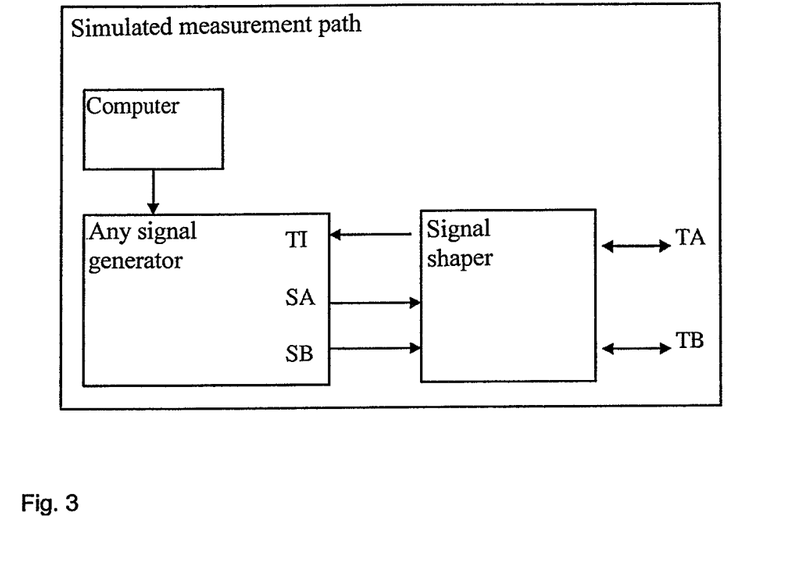
FIG. 3 shows an artificial measurement path consisting of the signal generator, the computer and the signal shaping unit.

FIG. 3 shows a design variation of the artificial measurement path consisting of a signal generator, a computer and a signal shaping unit. The signals are calculated by a computer and downloaded onto the signal generator. A typical signal shape, a sine function enveloped by a bell curve, can be calculated with the following equation:

$$s(t)=\exp(-(t/tau)^2)*(1-\exp(t/tau)^2))*\sin(2*pi*f0*t) \quad (5)$$

f0 is the center frequency of the acoustic transducer which would generate such a signal. The time constant tau determines the signal.

A version s1 of this signal that is delayed by the transit time t1 is calculated as follows:

$$s1(t)=s(t-t1). \quad (6)$$

The digital-to-analog converter receives this signal as a time series. This means that it is digitized at discrete samples. The digitized time series sd_i is:

$$sd\_i=rnd(DA\_Max*s1(ti)) \text{ with} \quad (7)$$

ti=i*Ta and DA_Max being the numerical value corresponding to the maximum amplitude that the digital-to-analog converter can output. Ta is the sampling interval of the digital-to-analog converter.

After the trigger impulse is received, the signal generator emits precisely these signals. From the emitted signals of the transmitter, a signal shaping unit generates the trigger impulse for the signal generator and forwards the signals from the terminals SA and SB of the signal generator to the terminals TA and TB, to which the terminals T1 and T2 of the transmitter are connected.

The measurement error of the transit time difference is calculated as the deviation of the measured transit time difference from the difference of the two predetermined transit times. By doing this, the errors of the time measurement of the transmitter are determined and the time measurement of the transmitter is calibrated.

Alternatively, it is possible to make a comparison of the volumetric flow rate determined by the transmitter and a predetermined volumetric flow rate. In order to achieve this, the average transit time and the transit time difference are calculated on the basis of the measurement path model and the measurement point parameters, such as the geometry of the real measurement path and the sound speeds of the measurement medium and the tube wall, and the transit times in the tube wall. The difference of the transit times of the two signals at the terminals T1 and T2 is calculated from the predetermined volumetric flow rate.

In the following, the method is explained in detail.

The flow causes a difference $\Delta t$ between the transit times tu and td in and against the flow direction. The following equation shows the dependency between the transit time tl in the fluid, the transit time difference $\Delta t$, and the transit times tu and td:

$$tu=tl+t0+\Delta t/2 \quad (8)$$

$$td=tl+t0-\Delta t/2 \quad (9)$$

t0 is the sum of all out-of-fluid times. Here, the transit times outside the flowing fluid are regarded as out-of-fluid times. The transit time tl in the fluid is determined from the sound speed in the fluid, the inner tube diameter and the angle of incidence.

$$tl=Di/(C*\cos(\gamma)) \quad (10)$$

The sound speed is determined by the fluid selection and is, for example, in the case of water at 20° C., C=1482 m/s. In correspondence with the method when calibrating by means of a flow calibration rig, a volumetric flow rate Q typical for the chosen tube diameter is predetermined. After converting the formula (4), the time difference $\Delta t$ can be calculated from the volumetric flow rate as follows:

$$\Delta t=Q*2tl/(KF*A*KT) \quad (11)$$

The transit time tl is calculated according to the equation (10). The transit times tu and td of the signals loaded onto the signal generator are calculated according to the equations (8) and (9).

The transmitter now determines the transit time and the transit time difference of the signals generated by the artificial measurement path and calculates from them the volumetric flow rate according to the equation (4). The measurement error to be determined is calculated by comparing this volumetric flow rate with the predetermined value.

The parametrization of the artificial measurement path is therefore based on the reversed calculations made by the transmitter. For the calculation of the signals, the exact same mathematical description of the measurement path is used as the one used by the transmitter. However, while the transmitter measures the transit time difference and the transit time of the signals and uses them to calculate the volumetric flow rate and the sound speed of the medium on the basis of the measurement path model, the artificial measurement path uses the volumetric flow rate and the sound speed of the medium as the basis for the calculation of the transit time and the transit time difference. All other parameters of the measuring apparatus are identical in the transmitter and in the artificial measurement path. In this example, the measurement path model is represented by the equations (1)-(4) and (8)-(11). The used parameters are the inner tube diameter, the sound speed, the out-of-fluid time, and the constants KF and KT.

In most cases, an adjustment of the calibrated meter is carried out after the calibration. This can, for example, happen by using the calibration result to calculate a correction factor and storing it in the transmitter. Because modern ultrasonic flow meters are equipped with microprocessors, the calculation of the adjustment data can also be carried out by the transmitter. For this, the transmitter has to know the predetermined value of the volumetric flow rate. Therefore, an advantageous design of the invention provides the possibility for the transmitter to retrieve or receive the predetermined value of the volumetric flow rate from the artificial measurement path via an interface and uses this predetermined value and the measured value to calculate the measurement error and the correction factor for the adjustment. By doing this, the adjustment is integrated in the flow meter and does not have to be carried out in the laboratory.

In order to ensure that the transmitter and the signal generator use the same measurement point parameters, the parametrization of the artificial measurement path can be carried out by the transmitter itself. Therefore, the transmitter assumes the task of the computer shown in FIG. 3. For this, the transmitter is connected to the artificial measurement path by means of a suitable interface. The transmitter calculates the signals on the basis of the measurement point parameters and the predetermined value of the volumetric flow rate and loads the signals onto the artificial measurement path. The measurement point parameters are the parameters of the aforementioned of the physical measurement path to be simulated by the artificial measurement path, such as the tube diameter and the sound speed. To achieve this, the parameter sets for one or several measurement points to be used for the calibration can be stored in the transmitter. The calibration is carried out by separating the transmitter from the acoustic transducers and instead connecting the artificial measurement path and by connecting the parametrization interface between the artificial measurement path and the transmitter. The calibration procedure can be started via the operating terminal of the transmitter. This design of the invention is user-safe to such a degree that it can be used for field calibration and is not reserved for the use in the calibration laboratory.

The invention claimed is:

1. A method for calibrating a transmitter of an ultrasonic flow meter operating according to a transit time difference method, the method for calibrating producing a calibration result, the ultrasonic flow meter comprising first and second acoustic transducer and said transmitter, the transmitter generating signals for output by the acoustic transducers and the transmitter amplifying incoming signals to the ultrasonic flow meter received at the transmitter from the acoustic transducers, the transmitter having a first and second terminal, the method comprising:

connecting a simulation measurement path apparatus, which defines a simulation measurement path, to the first and second terminals of the transmitter, the simulation measurement path apparatus comprising a computing device, a first digital to analog converter in signal communication with the first terminal, and a second digital to analog converter in signal communication with the second terminal;

emitting a first signal at the first terminal from the transmitter to the simulation measurement path apparatus and responding thereto by substituting for the first signal emitted at the first terminal a second signal received at least at the second terminal from the simulation measurement path apparatus, emitting a third signal at the second terminal from the transmitter to the simulation measurement path apparatus and responding thereto by substituting for the third signal emitted at the second terminal a fourth signal received at least at the first terminal from the simulation measurement path apparatus, wherein the third signal and the fourth signal are each generated independently of each other by the respective first and second digital to analog converter as simulations;

calculating by the computing device respective digital representations of the third signal and fourth signal independently of each other and storing said digital representations in a memory of the corresponding digital to analog converter for use in generating said third signal from said digital representation of the third signal and in generating said fourth signal from said digital representation of said fourth signal;

after a first transit time of said first signal emitted at the first terminal, which first transit time is predetermined independently of the simulation measurement path, outputting said third signal, which is different from a zero amplitude signal, to the second terminal;

calculating measurement error of the transmitter at least in part from a comparison of said predetermined first transit time and a first measured transit time between the first signal emitted at the first terminal and the third signal received in response at the second terminal;

after a second transit time of said second signal emitted at the second terminal is predetermined independently, outputting said fourth signal, which is different from the zero amplitude signal, to the first terminal;

calculating said measurement error of the transmitter at least in additional part from comparison of said predetermined second transit time and a second measured transit time between the second signal emitted from the second terminal and the fourth signal received in response at the first terminal;

comparing a difference between said predetermined first transit time and said predetermined second transit time to a difference between said first measured transit time for the third signal received at the second terminal and said second measured transit time for the fourth signal received at the first terminal.

2. The method according to claim 1, wherein the predetermined first transit time and the predetermined second transit time are calculated from a predetermined value of value of a volumetric flow rate and the measurement error of the transmitter is calculated from comparison of the predetermined value for the volumetric flow rate and a volumetric flow rate calculated by the transmitter from the received third and fourth signals.

3. The method according to claim 2, wherein the predetermined first and second transit times are calculated on the basis of a same measurement point model and front same measurement point parameters as those used by the transmitter.

4. The method according to claim 2, wherein an average transit time between the emitted first signal and the received third signal measured by the transmitter and between the emitted second signal and the received fourth signal measured by the transmitter are compared respectively with an average value corresponding to said predetermined first transit time and an average value corresponding to said predetermined second transit time; and wherein the measured transit time difference of the third signal and the fourth signal is compared with a difference of the corresponding predetermined first and second transit times.

5. The method according to claim 2, further comprising: calculating a correction factor from the calibration result and storing the correction factor in the transmitter.

6. The method according to claim 1, further comprising: calculating a correction factor from the calibration result and storing the correction factor in the transmitter.

7. The method according to claim 6, wherein the transmitter uses a data interface to retrieve a predetermined value of a volumetric flow rate from the simulation measurement path apparatus, using the retrieved value to calculate a measurement error and the correction factor for an adjustment in the transmitter.

8. The method according to claim 6, wherein simulation parameterization of the simulation measurement path is achieved by the transmitter itself by connecting the transmitter to the simulation measurement path by means of a data interface, performing calculations on the basis or measurement point parameters and a predetermined value of the volumetric flow rate, and transferring results of the calculation to the simulation measurement path apparatus.

9. The method according to claim 8, wherein parameter sets for at least one measurement point that can be described by an antificial simulation or the simulation measurement path apparatus are stored in the transmitter.

10. The method according to claim 1, wherein the predetermined first and second transit times are calculated on the basis of a same measurement point model and from same measurement point parameters as those used by the transmitter.

11. The method according to claim 1, wherein an average transit time between the emitted first signal and the received third signal measured by the transmitter and between the emitted second signal and the received fourth signal measured by the transmitter are compared respectively with an average value corresponding to said predetermined first transit time and an average value corresponding to said predetermined second transit time; and wherein the measured transit time difference of the third signal and the fourth signal is compared with a difference of the corresponding predetermined first and second transit times.

12. An apparatus for calibrating a transmitter of an ultrasonic flow meter operating according to a transit time difference method, the ultrasonic flow meter comprising first and second acoustic transducers and a transmitter, the transmitter generating signals for output by the acoustic transducers and the transmitter amplifying incoming signals to the ultrasonic flow meter received at the transmitter from the acoustic transducers, the transmitter having a first terminal and a second terminal, the apparatus forming a simulation measurement path coupled to the first and second terminals or the transmitter and calibrating the transmitter without regard for state of the flow meter transducers, said apparatus comprising:
    a computing device;
    a first digital to analog converter in electrical communication with the first terminal,
    a second digital to analog converter in electrical communication with the second terminal;
    wherein a first signal emitted at the first terminal and received at the simulation measurement path is responded to by substituting for the first signal emitted at the first terminal a first response signal from the simulation measurement path, generated at the second digital to analog converter based on an input from the computer, the first response signal being received at the second terminal;
    wherein a second signal emitted at the second terminal and received at the simulation measurement path is responded to by substituting for the second signal emitted at the second terminal a second response signal from the simulation measurement path, generated at the first digital to analog converter based on an input from the computer, the second response signal being received at the first terminal;
    wherein the computing device calculates a respective digital representation of the first and second response signals independently of each other and stores said respective digital representation in a memory of the corresponding digital to analog converter as said input to the respective digital to analog converter from said computer, so that after a first transit time with respect to said first emitted signal at the first terminal, which first transit time is predetermined, the first response signal that is di fluent from a zero amplitude signal is output at the second terminal and measurement error of the transmitter is calculated at least in part from comparison of said predetermined first transit time and a first measured transit time between the emitted first signal at the first terminal and the first response signal received at the second terminal, and so that after g second transit time with respect to said second emitted signal at the second terminal, which second transit time is predetermined, the second response signal that is different from the zero amplitude signal is output to the first terminal and said measurement error of the transmitter is further calculated at least in part from comparison of said predetermined second transit time and a second measured transit lime between the emitted signal at the second terminal and the respective response signal at the first terminal; and
    wherein the computing device compares a difference between said predetermined first transit time and said predetermined second transit time to a difference between said first measured transit time for the first response signal received at the second terminal and said second measured transit time for the second response signal received at the first terminal, to calculate a measurement error.

13. The apparatus or claim 12, wherein the first and second digital to analog converters are part of a signal source: further comprising a signal shaping unit; and wherein the first digital to analog converter is in electrical communication with the first terminal via the signal shaping unit, and the second digital to analog converter in electrical communication with the second terminal via the signal shaping unit.

14. The apparatus according to claim 13, wherein the signal source is a signal generator.

15. The apparatus according to claim 14, wherein the signal generator is connected to the computer, which controls the signal source.

16. A simulation measurement path apparatus for calibrating a transmitter of an ultrasonic flow meter according to a transit time difference method, the ultrasonic flow meter comprising the transmitter, the transmitter having a first acoustic terminal and a second acoustic terminal, the simulation measurement path apparatus being configured to be coupled to the first acoustic terminal and the second acoustic terminal so as to simulate a path for ultrasound signals transmitted from first acoustic terminal and the second acoustic terminal, the simulation measurement path apparatus being distinct from the flow meter, and comprising:
    a computer;
    a signal shaping unit having a first terminal, a second signal terminal and a third signal terminal, each one or the first signal terminal, the second signal terminal, and the third signal terminal being distinct from each for the first acoustic terminal and the second acoustic terminal, the first signal terminal being connected to the transmitter first acoustic terminal, and the second signal terminal being connected to the transmitter second acoustic terminal; and
    a signal source connected to the signal shaping unit and comprising a first digital to analog converter coupled to a first terminal or the signal source and a second digital to analog converter coupled to a second terminal of the signal source;
    wherein the signal shaping unit's third signal terminal outputs a trigger impulse to the signal source in response to either a first signal received from the transmitter's first acoustic terminal at said signal shaping unit's first signal terminal or a second signal received from the transmitter's second acoustic terminal at said second signal terminal or the signal shaping unit;
    wherein a return signal is generated at the signal source responsive to the trigger impulse and forwarded to the signal shaping unit via the signal source first or second terminal, wherein said return signal is generated by the first or second digital to analog converter based on digital input from the computer; and
    wherein in response to the return signal received at the signal shaping unit via the signal source second terminal, the signal shaping unit outputting a first response signal to the transmitter second acoustic terminal, and in response to the return signal received at the signal shaping unit via the signal source first terminal, the signal shaping unit outputting a second response signal to the transmitter first acoustic terminal.

17. The apparatus according to claim 16 wherein the signal source is a signal generator.

18. The apparatus according to claim 17, wherein the signal generator is connected to a computer which controls the signal source.

19. The simulation measurement path apparatus according to claim 16, wherein the computer is configured to calculate a measurement error by comparing a difference between a predetermined first transit time and a predetermined second transit time to a difference between a first measured transit time for the first response signal received at the transmitter second acoustic terminal and second measured transit time for the second response signal received at the transmitter first acoustic terminal to calculate a measurement error.

* * * * *